United States Patent
Bettcher

[15] 3,693,684
[45] Sept. 26, 1972

[54] CUTTING APPARATUS
[72] Inventor: Louis A. Bettcher, Amherst, Ohio
[73] Assignee: Bettcher Industries, Inc., Birmingham, Ohio
[22] Filed: Dec. 28, 1970
[21] Appl. No.: 101,457

[52] U.S. Cl. ............................................. 146/105
[51] Int. Cl. ............................................. B26d 4/28
[58] Field of Search .............. 146/105, 124; 144/180

[56] References Cited
UNITED STATES PATENTS 3,434,519  3/1969  Bettcher ..................... 146/124
2,727,542  12/1955  Fischer .................... 144/180 X Primary Examiner—Willie G. Abercrombie
Attorney—Watts, Hoffman, Fisher & Heinke

[57] ABSTRACT

Apparatus for severing a comestible product, such as, meat, vegetables, and the like, having a multiple compartment product carrier rotatable about a generally vertical axis for moving a product or products to be severed past a rotating knife and which can be loaded without interrupting its rotation.

7 Claims, 3 Drawing Figures

INVENTOR.
LOUIS A. BETTCHER
BY Watts, Hoffmann Fisher & Heinke
ATTORNEYS

INVENTOR.
LOUIS A. BETTCHER
BY Watts, Hoffmann,
Fisher & Heinke
ATTORNEYS.

CUTTING APPARATUS

FIELD OF INVENTION

The invention relates to cutting apparatus and more particularly to such apparatus useful for slicing and/or otherwise cutting comestible products.

PRIOR ART

Comestible products have heretofore been sliced and otherwise cut by being moved past a knife by a multiple compartment product carrier rotatable about a vertical axis as exemplified by U.S. Pat. No. 3,434,519.

SUMMARY OF INVENTION

The present invention provides an apparatus for cutting preferably comestible products comprising a multiple compartment product carrier or magazine rotatable about a generally vertical axis and into which products can be loaded without stopping rotation of the carrier. The carrier is preferably so constructed that the product to be cut is forced downwardly while in the carrier by centrifugal force incident to its rotation. For this purpose the radially outer and/or the trailing sides of the product receiving compartments are inclined inwardly in an upwardly direction.

The invention will be better understood and further advantages, as well as objects, thereof will become apparent from the accompanying drawings and the following description of the preferred embodiment of the invention.

DESCRIPTION OF A PREFERRED EMBODIMENT

Figure 1:
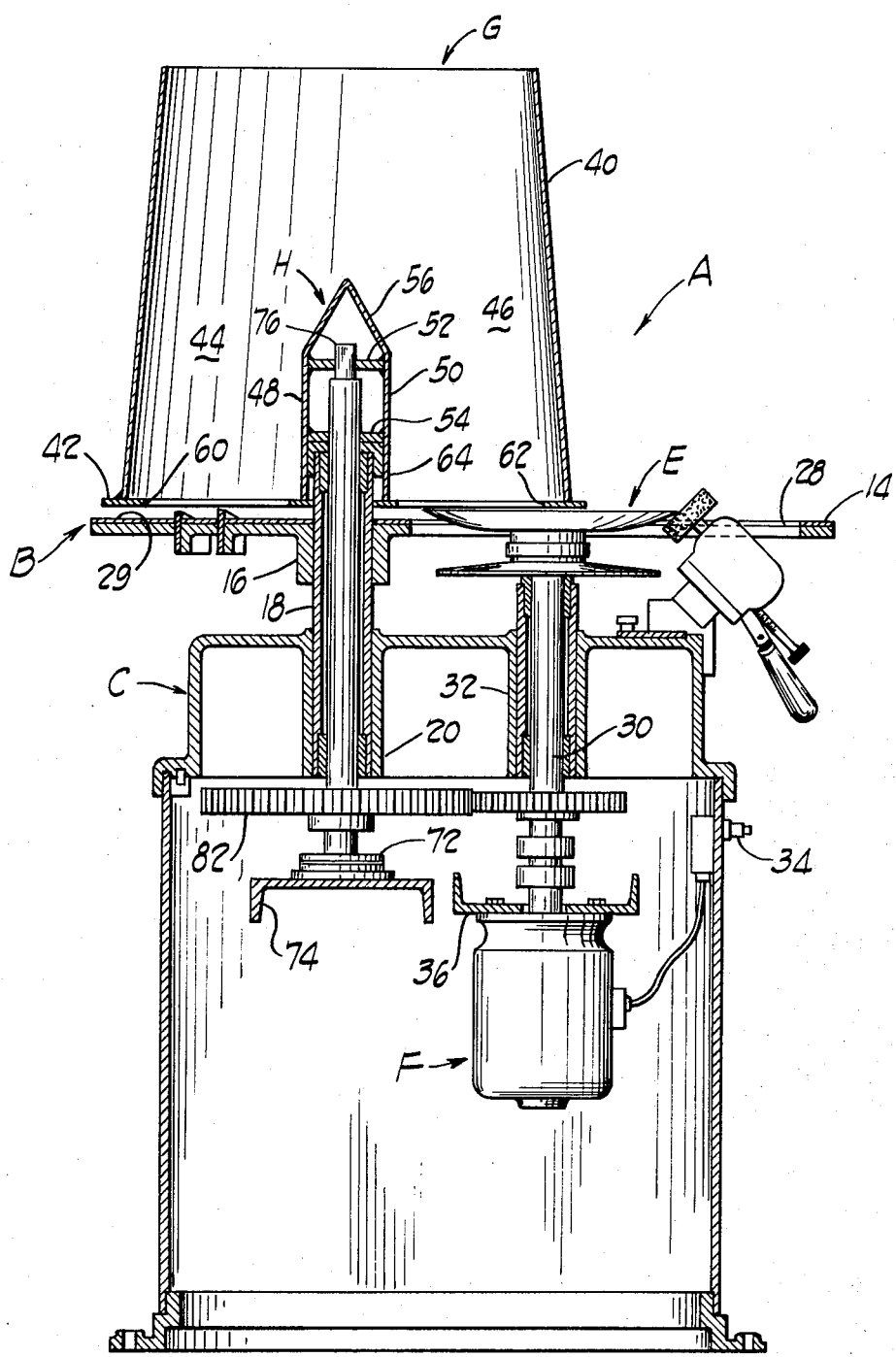
FIG. 1 is an elevational view, with parts broken away and in section, of an apparatus embodying the invention.
Figure 2:
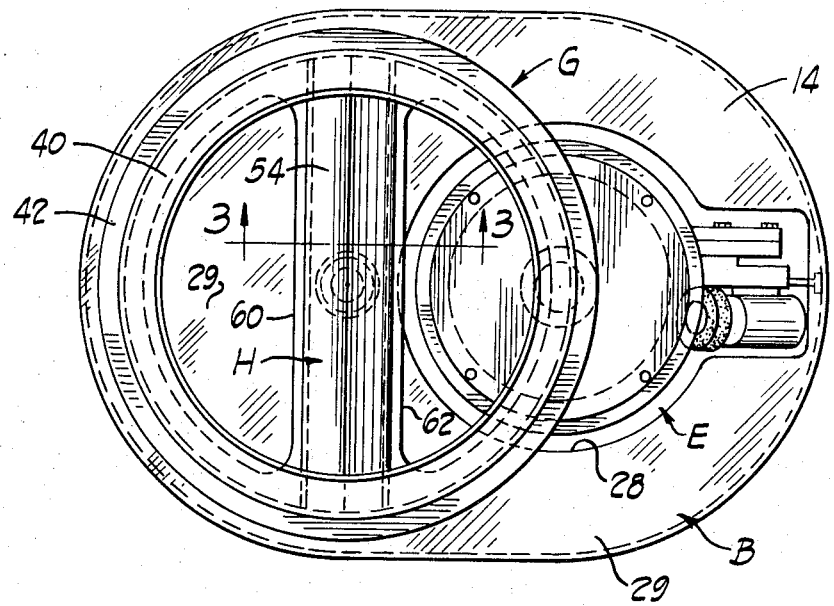
FIG. 2 is a plan view of the apparatus shown in FIG. 1.
Figure 3:
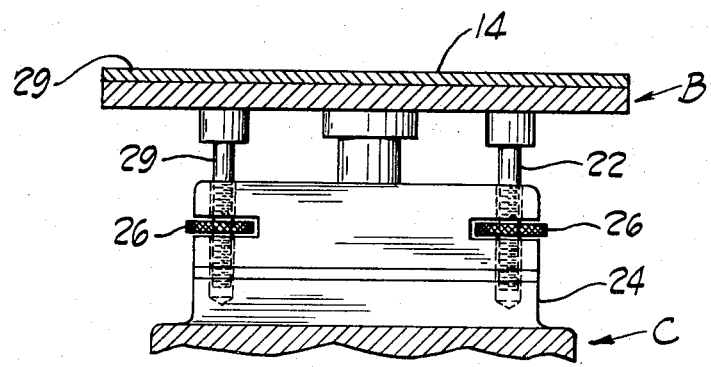
FIG. 3 is a fragmentary sectional view approximately on the line 3—3 of FIG. 2.

The preferred embodiment of the invention is the apparatus illustrated in the drawings and designated generally by the reference character A, and which is especially designed for slicing and otherwise cutting a comestible product or products, for example, meat. The apparatus comprises a stationary table-like member B spaced above and supported for vertical adjustment on a tubular member fixed in a cover member C of a floor supported base or cabinet D, a disk-like knife E located in an aperture in the table B and rotatably supported in the cover C of the cabinet D with its cutting edge slightly above the upper or top planar side of the table B and continuously driven by a motor F within the cabinet D, and a multiple compartment product carrier G fixed to the upper end of a shaft supported in the cover C of the cabinet D for rotation about a vertical axis offset transversely of the axis of rotation of the knife E.

The table B, preferably includes a stainless steel top 14, and is provided with a downwardly extending boss 16 which surrounds the upper end of a tubular shaft 18 fixedly secured in a boss 20 of the cover C of the cabinet D, which cover is preferably of cast aluminum metal. The vertical position of the table B is determined by a plurality of threaded members 22 secured in downwardly projecting bosses in the underside of the table B and the lower ends of which project into suitable apertures in a projection 24 on the upper side of the cover C. Knurled nuts 26 threaded on the lower end of the threaded members 22 and located in slots in the cover C provide means for raising and lowering the table.

The knife E, which is located in an aperture 28 in the table C, is secured to the upper end of a shaft 30 rotatably supported in a second boss 32 in the cover C with the axis of rotation offset from the axis of the tubular member 18. The cutting edge of the knife E is normally located offset above the planar surface 29 of the table B an amount which can be varied by manipulation of the knurled nuts 26. The lower end of the shaft 30 is directly connected to the driven shaft of the motor F, the operation of which is controlled by an electric switch 34 fixed to the cabinet D. The motor F is carried by a channel member 36 fixedly secured within the cabinet D.

The product carrier G is preferably made of stainless steel and comprises a vertically oriented frusto-conical tubular member 40 having its upper end opened and its lower end partly closed by a plate-like member 42 secured thereto. Approximately the lower one-third or one-half of the carrier G is divided into two product compartments or chambers 44, 46 by a centrally located built-up structure H extending transversely across the lower part of the carrier. The structure H comprises two vertically oriented transverse plates 48, 50, spaced from one another by horizontally spaced reinforcing plates 52, 54 welded thereto and an inverted V-shaped member 56 having its lower edges welded to the upper edge of the plates 48, 50. The bottom plate 42 of the product carrier has suitable apertures 60, 62 therethrough at opposite sides of the axially oriented transversely extending partition structure H. The openings 60, 62 are of such a size that essentially the entire bottoms of the compartments 44, 46 are open to permit the unobstructed passage of products therethrough.

The construction is such that products fed into the top of the product carrier G will be diverted by the plate 56 to one side or the other of the transversely extending structure H and when they are the bottom product in one or the other product receptacle or compartment they will project through one or the other of the apertures 60, 62 and rest upon the upwardly facing planar surface 29 of the table B with their lower ends slightly below the plane of the cutting edge of the knife E and in position to be severed by the knife when the product carrier is rotated.

The product carrier G is rotatably supported on the upper end of the tubular member 18 by a suitable bearing member 64 located within the structure H and fixed to the underside of the reinforcing plate 52. The bearing member 64 includes an inwardly extending flange adapted to rest upon the upper end of the member 18.

The product carrier G is adapted to be rotated by a shaft 70 rotatably supported by suitable bearings at opposite ends of the tubular member 18 and a thrust bearing 72 interposed between a shoulder on the lower end of the shaft 70 and the upper side of a channel member 74 extending transversely across the interior of the housing or cabinet D. Rotation of the shaft 70 is transmitted to the product carrier G by a square projection 76 on the upper end of the shaft which is received in a similarly-shaped aperture in the plate 52 of the structure H. The shaft 70 is adapted to be rotated from the motor F through gears 80, 82 enmeshed with one another and suitably keyed to the shafts 30 and 70, respectively. The gears 80, 82, preferably have a ratio in the order of 1 to 3 or 1 to 4 so that the knife E rotates at a considerably higher speed than the rotation of the product carrier G.

The construction of the apparatus A thus far described, except for the product carrier, is generally similar to the apparatus shown in U.S. Pat. No. 3,434,519, previously referred to.

From the foregoing description of the preferred embodiment of the invention it will be apparent that the objects heretofore enumerated and others have been accomplished and that there has been provided a new and improved apparatus for cutting comestible products having a rotatable product carrier or magazine which can be loaded without stopping the same.

While the preferred embodiment of the invention has been described in considerable detail it is to be understood that the invention is not limited to the particular construction shown. The product supporting planar surface, for example, rather than being the top of a table or platform member adjustable relative to the supporting cabinet or frame, can be an integral part of the frame or cabinet assembly and provision made for adjusting the knife means normal to the product supporting planar surface in order to vary the thickness of the parts serviced from the product or products in the magazine. Other alternative constructions will suggest themselves to those skilled in the art to which the invention relates and it is the intention to cover all adaptations, modifications and uses of the disclosed apparatus coming within the scope of the appended claims.

Having thus described my invention, what I claim is:

1. In an apparatus for severing parts from a comestible product, such as, meat, a frame assembly having an upwardly facing planar surface provided with an aperture extending therethrough, rotary knife means in said aperture and supported by said frame assembly for rotation about an axis normal to said planar surface with its cutting edge offset from said planar surface, means for rotating said rotary knife means, a product carrier including a tubular member spaced above said planar surface and supported by said frame assembly for rotation about an axis parallel with and offset from the axis of rotation of said knife means, axially oriented partition means spaced below the upper end of said tubular member and extending transversely of said tubular member adjacent to said planar surface dividing the lower part of said tubular member into a plurality of compartments or chambers, and means for rotating said product carrier.

2. In an apparatus for severing parts from a comestible product, such as, meat, a frame assembly having an upwardly facing planar surface provided with an aperture extending therethrough, rotary knife means in said aperture and supported by said frame assembly for rotation about an axis normal to said planar surface with its cutting edge offset from said planar surface, means for adjusting the relative offset position of said planar surface and knife means, means for rotating said rotary knife means, a product carrier including a tubular member spaced above said planar surface and supported by said frame assembly for rotation about an axis parallel with and offset from the axis of rotation of said knife means, an axially oriented partition member spaced below the upper end of said tubular member and extending transversely of said tubular member adjacent to said planar surface dividing the lower part of said tubular member into a plurality of compartments or chambers, and means for rotating said product carrier.

3. In an apparatus for severing parts from a comestible product, such as, meat, a frame assembly having an upwardly facing planar surface provided with an aperture extending therethrough, rotary knife means in said aperture and supported by said frame assembly for rotation about an axis normal to said planar surface with its cutting edge offset from said planar surface, means for rotating said rotary knife means, a product carrier including a frusto-conical tubular member spaced from said planar surface and supported by said frame assembly for rotation about an axis parallel with and offset from the axis of rotation of said knife means, an axially oriented partition member spaced below the upper end of said tubular member and extending transversely of said frusto-conical tubular member adjacent to said planar surface dividing the lower part of said frusto-conical tubular member into a plurality of compartments or chambers, and means for rotating said product carrier.

4. In an apparatus for severing parts from a comestible product, such as, meat, a frame assembly, a table-like member supported by said frame assembly and having an upwardly facing planar surface provided with an aperture extending therethrough, rotary knife means in said aperture and supported by said frame assembly for rotation about an axis normal to said planar surface with its cutting edge offset from said planar surface, means for varying the relative position of said frame assembly and said table-like member in the direction of the axis of rotation of said knife means, means for rotating said rotary knife means, a product carrier including a frusto-conical tubular member spaced from said planar surface and supported by said frame assembly for rotation about an axis parallel with and offset from the axis of rotation of said knife means, an axially oriented partition member spaced below the upper end of said tubular member and extending transversely of said frusto-conical tubular member adjacent to said planar surface dividing the lower part of said frusto-conical member into a plurality of compartments or chambers, and means for rotating said product carrier.

5. In an apparatus for severing parts from a comestible product, such as, meat, a frame assembly having an upwardly facing planar surface provided with an aperture extending therethrough, rotary knife means in said aperture and supported by said frame assembly for rotation about an axis normal to said planar surface with its cutting edge offset from said planar surface, means for adjusting the relative offset position of said planar surface and knife means, means for rotating said rotary knife means, a product carrier including a tubular member spaced from said planar surface and supported by said frame assembly for rotation about an axis parallel with and offset from the axis of rotation of said knife means, an axially oriented partition member spaced below the upper end of said tubular member and extending transversely across the part of said tubular member adjacent to said planar surface dividing said part of said tubular member into a plurality of compartments or chambers, and means for rotating said product carrier.

6. In an apparatus for severing parts from a comestible product, such as, meat, a frame assembly having an upwardly facing planar surface provided with an aperture extending therethrough, rotary knife means in said aperture and supported by said frame assembly for rotation about an axis normal to said planar surface with its cutting edge offset from said planar surface, means for rotating said rotary knife means, a product carrier including a frusto-conical tubular member spaced from said planar surface and supported by said frame assembly for rotation about an axis parallel with and offset from the axis of rotation of said knife means, an axially oriented partition member spaced below the upper end of said tubular member and extending transversely across the part of said frusto-conical tubular member adjacent to said planar surface dividing said part of said frusto-conical tubular member into a plurality of compartments or chambers, and means for rotating said product carrier.

7. In an apparatus for severing parts from a comestible product, such as, meat, a frame assembly, a table-like member supported by said frame assembly and having an upwardly facing planar surface provided with an aperture extending therethrough, rotary knife means in said aperture and supported by said frame assembly for rotation about an axis normal to said planar surface with its cutting edge offset from said planar surface, means for varying the relative position of said frame assembly and said table-like member in the direction of the axis of rotation of said knife means, means for rotating said rotary knife means, a product carrier including a frusto-conical tubular member spaced from said planar surface and supported by said frame assembly for rotation about an axis parallel with and offset from the axis of rotation of said knife means, an axially oriented partition member spaced below the upper end of said tubular member and extending transversely across the part of said frusto-conical tubular member adjacent to said planar surface dividing said part of said frusto-conical member into a plurality of compartments or chambers, and means for rotating said product carrier.

* * * * *